Patented June 4, 1935

2,004,084

UNITED STATES PATENT OFFICE 2,004,084

PROCESS OF MAKING OLEFINE DERIVATIVES

Walton B. Scott, Lloyd S. Bovier, and Ernest D. Matthews, Niagara Falls, N. Y., assignors to Hooker Electrochemical Company, Niagara Falls, N. Y., a corporation of New York No Drawing. Application April 18, 1932, Serial No. 606,070

15 Claims. (Cl. 260—156)

This invention relates to the treatment of gases such as olefines by absorption and hydrolysis as illustrated for instance by the production of an alcohol, such as ethanol, from the corresponding olefine ethylene.

The object of the invention is to provide a process which will be inexpensive in operation and in the cost of apparatus involved, and which will be capable of accurate control to give a uniformly high yield of the desired end product.

Another object of the invention is to provide a process utilizing relatively high concentrations and high pressure so as to decrease the size of the apparatus and reduce the bulk of the chemicals employed.

Further objects of the invention are to minimize the production of undesirable by-products and to confine the final product to the desired material such as ethanol, and at the same time to render the absorbing agent used in the process easily recoverable and reusable.

Still further objects of the invention particularly in the details of the apparatus and treatments involved will appear from the following specification.

The treatment of some substances often subjects them to an intermediate agent in preparation for the final desired reaction. Sulfuric acid, for instance, may be used to absorb an olefine and the resulting olefinated acid then hydrolyzed to yield the corresponding alcohol, and the process of this invention will be described as typically applied to the production of ethyl alcohol from ethylene.

Ethylene is made commercially available in connection, for instance, with the purification and cracking of hydrocarbon oils, and it is frequently in admixture with other gases. It will be assumed in the present process that the starting material is 30% to 35% ethylene with 70% to 65% of other gases, such as methane and ethane.

These other gases are saturated compounds while the ethylene is unsaturated and reactive with reagents, such as sulfuric acid, toward which the methane and ethane are inert. Consequently, by proper treatment with surfuric acid the ethylene may be absorbed and separated from the inert gases which are passed on and discharged.

In the process of this invention the absorption of the ethylene is carried to the point of strong concentration of the resulting liquor which is an ethylated sulfuric acid in which the amount of combined ethylene is in the ratio of 0.8 mol. or more of ethylene per mol. of $SO_3$ present in any form, the ratio being preferably about 1.25 mol. $C_2H_4$ per mol. of $SO_3$. Such an ethylated sulfuric acid consists essentially of a mixture of sulfuric acid, ethyl sulfuric acid and diethyl sulfate in proportions which may vary within wide limits without affecting the utility of the product for the subsequent operations.

The gas supply containing for instance 30% ethylene to 70% inert gases is passed into towers containing sulfuric acid of suitable strength. The continuous stream of ethylene is absorbed in the towers and progressively increases the degree of saturation of the acid in each tower.

Preferably the acid is concentrated to a strength of 98% but may be as low as 93% $H_2SO_4$. The temperature of absorption is about 80° C. with toleration of 20° C. either way, and the absorption is carried on under pressure, for instance, 75 to 300 lbs. per square inch.

To give effective contact the preferred type of apparatus comprises a vertical tower or upright pipe containing the acid and with the feed gas entering through a diffuser plate of fine grain alundum or other suitable porous material located near the bottom of the tower. The gas is thereby divided into minute bubbles for more effective contact with the acid.

It has been found, when the ethylene supplied to such an apparatus is in admixture with an inert gas which is not appreciably absorbed by the acid, that the ethylene content of this mixed gas after it has traversed a definite column of acid varies as the rate of flow is changed, but contrary to expectations the percentage of ethylene in the exit gas, does not increase continuously as the rate of flow is gradually increased from zero. Actually the ethylene content of the exit gas reaches a minimum at a rate of flow which can be experimentally determined for a given type of diffuser.

In a specific case with a mixture comprising a constant proportion of ethylene and nitrogen a flow of 5.6 cubic feet per minute through an experimental tower was continued until the percentage of ethylene in the exit gas dropped to 4.4% due to increase in the solvent power of the absorbing medium. Then the rate of flow was suddenly reduced to 3.4 cubic feet per minute and the percentage of ethylene in the exit gas immediately rose to 6%. Continued absorption increased the solvent power and decreased the exit percentage to 5.6 at which point the rate of flow was increased to 5.6 cubic feet per minute and the exit percentage of ethylene then sharply dropped to 2.6. As the solvent power of the acid increased the exit percentage further fell to 0.8 but quickly quadrupled to 3.2 when the rate of flow was lowered to 3.4 cubic feet per minute. Continued improvement in the solvent power of the absorbent dropped this to 1.2% ethylene in the exit gas and an immediate drop to .6% followed an increase in the rate of flow to 5.6 cubic feet per minute. After this the percentage of ethylene in the exit gas reversed and steadily rose due to decrease in the solvent power of the acid medium. Irrespective of the solvent power of the absorbent, each decrease in the rate of feed was accompanied by an increase in the percentage of ethylene in the exit gas, and each increase in rate by a decrease in this percentage. This shows that there was a more effective absorption of the ethylene at the higher rate of feed through the tower so that this higher rate will correspond more nearly with the most favorable rate for maximum absorption.

Consequently the curve of absorption varies with the rate of flow so that it has a maximum above a certain critical minimum rate of passing of the gases, and it is important to maintain the flow above this minimum in order to maintain the desired high rate of absorption.

By this process the final ethylated sulfuric acid is produced in very concentrated form by steps involving relatively simple apparatus. The dilution of the ethylene with other gases which are inert toward sulfuric acid decreases the rate and degree of absorption as compared with that obtained with pure ethylene, other conditions remaining constant. At the same time undesirable reactions are also retarded, and hence it is possible, when using dilute ethylene, to operate at higher temperatures and working pressures. The stronger the sulfuric acid, the higher will be the rate of reaction with ethylene. With 93% acid the reaction is sufficiently rapid to be commercially effective and as the strength of the acid increases the reaction becomes more rapid, and the amount of ethylene which can be combined with the acid also increases. The presence of free $SO_3$ should be avoided as this tends to form compounds difficult to hydrolyze which have no value in the production of alcohol or ether and are harmful in lowering the ethylene efficiency. They also tend to make the reconcentration of the sulfuric acid more difficult and increase the amount of acid lost by decomposition. Consequently, acid stronger than 98% $H_2SO_4$ is undesirable.

The rate of absorption increases rapidly with increase in temperature and the amount of ethylene which can be combined also increases. Beyond certain temperature limits, depending upon other conditions, such as strength of acid, pressure and dilution of ethylene, decomposition reactions set in which destroy both ethylene and sulfuric acid. While the temperature should be kept as high as is compatible with safety, temperatures above 100° C. are to be avoided and 80° C. is preferred as most satisfactory.

Increasing the working pressure also increases the rate of reaction. The degree of absorption is also increased but at a relatively much less rate. At 300 lbs. per square inch, or even less, the rate is sufficiently rapid to be thoroughly commercial, and at higher pressures, especially if pure ethylene is used, there are apparently undesirable reactions lowering the yields and increasing the acid losses. It seems probable that at these higher pressures there is a polymerization of the ethylene resulting in an oily product contaminating the crude ethanol.

In the bubble tower absorption apparatus the rate of absorption is high and the scrubbing of the gas is complete. The simple construction avoids the use of moving parts, and in particular the batch-handling of the acid dispenses with any pumping of acid under pressure. The small bubbles formed at the high rate of injection of the gas through the bottom plate combined with the system utilizing the most efficient ethylated sulfuric acid for the final scrubbing gives a very concentrated final liquor in most desirable form for the subsequent hydrolysis according to this process.

Such a liquor comprises varying proportions of ethyl sulfuric acid, for instance, $[C_2H_5HSO_4]$ and diethyl sulfate $[(C_2H_5)_2SO_4]$ and sulfuric acid, and in order to produce ethanol most effectively and with the least amount of by-products, such as ether, while at the same time ending with the residual sulfuric acid in form suitable for reconcentration and reuse, the process of this invention exercises an accurate control of all of the conditions of hydrolysis.

In order to keep the formation of ether as little as possible, the ethanol is removed from the zone of reaction soon after it is formed because continued presence of ethanol in any quantity will tend to the formation of ether according to the following equations:

(a) $(C_2H_5)HSO_4 + H_2O = C_2H_5OH + H_2SO_4$
(b) $(C_2H_5)HSO_4 + C_2H_5OH = (C_2H_5)_2O + H_2SO_4$

Equation *a* represents the reaction between ethyl hydrogen sulfate and water to form alcohol. Equation *b* represents the reaction between ethyl hydrogen sulfate and alcohol to form ether. After a portion of the ethyl hydrogen sulfate has reacted according to equation *a* to produce alcohol, then there is the possibility of a reaction between this alcohol and ethyl hydrogen sulfate to form ether, according to equation *b*. This latter reaction is favored when a high concentration of sulfuric acid is present and is involved in the well known synthesis of ether from alcohol and sulfuric acid.

In order to minimize the cost of reconcentrating the sulfuric acid recovered from the hydrolysis, it is desirable to keep the amount of water employed in the hydrolysis at a minimum. This condition favors ether formation if the alcohol is allowed to accumulate in the hydrolyzer. Under these conditions there will then be two competing reactions *a* and *b*. The relative rates of these reactions (i. e., the relative amounts of alcohol and ether in the finished products) depend among other things upon the relative amounts of water and alcohol available for reaction with the ethyl hydrogen sulfate. Anything which tends to increase the proportion of water, for instance, the removal of alcohol, tends to favor reaction *a*. Thus by continuously removing the alcohol by distillation during the addition of the ethylated sulfuric acid, the proportion of water is kept high, concentration of the acid is avoided and the amount of alcohol present is kept at a minimum.

Similarly with diethyl sulfate, the hydrolysis can conceivably take place in two ways—either in a single stage (c) $(C_2H_5)_2SO_4 + H_2O = (C_2H_5)_2O + H_2SO_4$ or in two stages (d) $(C_2H_5)_2SO_4 + H_2O = (C_2H_5)HSO_4 + C_2H_5OH$
(a) $(C_2H_5)HSO_4 + H_2O = C_2H_5OH + H_2SO_4$ Reaction *c* involves an unusual break up of the water molecule into hydrogen (which goes with the $SO_4$) and oxygen (which forms ether). The two stage reaction *d* and *a* involves only the ordinary dissociation of water into hydrogen and hydroxyl, and is not only more probable, but is actually the main reaction since alcohol is produced from diethyl sulfate, which could not be accomplished according to equation *c*. Therefore, since ethyl hydrogen sulfate is an intermediate product in the hydrolysis of diethyl sulfate, the same considerations apply here as in the case of the hydrolysis of ethyl hydrogen sulfate, and it is equally important in the hydrolysis of both of these to maintain conditions reducing to a minimum the tendency toward reaction b forming ether.

The amount of water used in the hydrolysis is preferably a sufficient excess over that required by theory for the production of alcohol by reaction with the combined ethylene so that the residual sulfuric acid will be diluted to 50% $H_2SO_4$. This is equivalent to about 0.9 parts by weight of water to one part by weight of ethylated sulfuric acid, the limits being apparently 0.5 to 2.0 parts of water per part of ethylated acid, corresponding to a dilution of the residual acid to 60% and 30% respectively.

In general the greater the dilution of the ethylated acid the higher the alcohol ether ratio in the product of the hydrolysis. On the other hand, if too much water is used the complete recovery of the alcohol is rendered more difficult, and the cost of reconcentration of the sulfuric acid is excessive. By using water giving residual sulfuric acid of 50% strength, over-dilution of the acid is avoided, and at the same time a high yield of alcohol is obtained.

To this water there is gradually added the concentrated ethylated sulfuric acid, the water being maintained at the boiling point and under substantially atmospheric pressure. In this way the hydrolysis is carried out under dilute conditions and the alcohol is removed as soon as it is formed so as to minimize any tendency toward ether formation by reaction. An agitated vessel is used fitted with a reflux column and equipped with heating coils or jacket. The agitation gives good contact between the water in the vessel and the ethylated acid as it is added gradually from a feed reservoir. The reflux column prevents the removal of excessive amounts of water with the alcohol vapors, and thus avoids concentration of the acid which would have objectionable results on the source of the hydrolysis. It has also been found advisable at the start to add about 15% of the ethylated acid to the water before it reaches a distilling temperature, since otherwise a portion of the diethyl sulfate tends to distill over with the steam before it has time to react, and this diethyl sulfate appears as an oil in the final distillate.

If insufficient water is used to dilute the ethylated sulfuric acid, the refluxing temperature at which the hydrolysis is carried out may be above the temperature at which decomposition of ethyl sulfuric acid begins (about 125° C.) and a loss in yield may result. Under the conditions of this process, however, where the hydrolyzing liquor is retained in dilute condition, the temperature does not rise to this point and no concentration is reached giving such high temperatures until after the hydrolysis has been completed. Therefore, the charge in the hydrolyzer can be held at the refluxing temperature throughout the reaction beginning with temperatures of about 98° C. at the start to the boiling point of the residual acid at the finish. The vapor temperature is such as results from a distillation of mixtures of alcohol, water and ether, and usually increases from 80° C. to 98° C. as the operation proceeds.

Since the main portion of the ethylated acid is added slowly to the water at such a rate that alcohol can distill off as produced, it will not accumulate in the reaction vessel; thus the actual time required for addition will depend upon the rate of distillation that can be realized. On a laboratory scale about 850 gm. of ethylated acid were added in about one hour. Following the addition of the ethylated acid, hydrolysis is continued until the distilling temperature reaches 98° C. indicating practically complete removal of the alcohol. The product comprising dilute alcohol and a small amount of ether continuously distills through a fractionating column and is condensed by a suitable condenser. The hydrolysis should be completed to avoid difficulty in reconcentration of the final acid.

Hitherto, practical difficulties have been experienced in hydrolyzing ethylated acid of more than 50% of the amount required to completely replace all of the replaceable hydrogen of the acid employed. Consequently, higher saturations have usually not been desired since the diethyl sulfate increases with the degree of saturation, and this has not been so readily hydrolyzed as the ethyl sulfuric acid of the lower saturations. With the process of this invention these objections are overcome and good yields of alcohol may be obtained from ethylated sulfuric acid saturated much in excess of 50%. With very high ethylene absorption, it is preferable to have a more dilute condition during hydrolysis and with 80% absorption of two mols. of $C_2H_4$ per mol. of $SO_3$ a 30% acid is satisfactory, and comparable results are obtained with 40% or less of two mols. $C_2H_4$ when diluted so that a 70% acid is obtained after hydrolysis. It is preferred, however, to work with 60–65% of two mols. absorption and a 50–55% $H_2SO_4$ after hydrolysis. Consequently, the condition of the absorption step will preferably be arranged and controlled to give a saturation of the sulfuric acid corresponding to 60–65% of two mols. of $C_2H_4$ per mol. of $SO_3$ and the quantity of water for hydrolysis will be predetermined to give a final concentration of the sulfuric acid of 50–55% at the end of the hydrolysis.

The method thus starts out with extremely dilute condition of the hydrolyzing liquid and only gradually strengthens this while continuously removing the alcohol as formed so as to reduce the chances of ether formation. The strongest acid is the residual acid at the end of the process, and it is thus possible to control the steps in such a way as to have this final acid of sufficient strength for easy reconcentration and reuse. This method also makes possible the use of greater percentage of absorption of ethylene in sulfuric acid hitherto avoided in the production of alcohol from ethylene, and consequently, a smaller amount of acid has to be provided and reconcentrated, and at the same time the reconcentration is simplified and rendered inexpensive by the accurate control of the final concentration of the acid resulting from the hydrolysis.

Various modifications and substitutions may be made in the individual steps of the process. Any effective bubble forming means may be used in the absorbing apparatus, or a liquid film or spray forming type of apparatus may be used to give the surface contact between the gas and acid. The process may be applied to other olefines, and sulfates resulting from the absorption may be used either for the manufacture of alcohols or as alkylating reagents in other ways.

We claim:

1. The process of producing an alcohol comprising bringing the corresponding olefine in contact with an acid reactive therewith, and absorbing said olefine in said acid in excess of 50% of the amount required to completely replace all of the replaceable hydrogen of the acid employed, and then hydrolyzing said acid by progressively entering it into a predetermined quantity of water, accumulating said acid in said water with progressively increasing concentration and distilling off the resulting alcohol immediately upon its formation so as to avoid an accumulation of alcohol in the hydrolyzing liquid.

2. The process of producing an alcohol comprising bringing the corresponding olefine in contact with an acid reactive therewith, and substantially saturating said acid with said olefine, and then hydrolyzing said acid by progressively entering it into a predetermined quantity of water containing a progressively increasing amount of acid and distilling off the resulting alcohol immediately upon its formation so as to avoid an accumulation of alcohol in the hydrolyzing liquid.

3. The process of forming ethanol comprising absorbing ethylene in sulfuric acid to produce an ethylated sulfuric acid in concentrated form containing diethyl sulfate, adding said ethylated acid progressively to water and simultaneously heating the mixture to distill over the ethanol as it is formed by the hydrolysis while accumulating sulfuric acid in said water with progressively increasing concentration.

4. The process of forming ethanol comprising absorbing ethylene in sulfuric acid to produce an ethylated sulfuric acid containing diethyl sulfate corresponding to absorptions greater than 50% of two mols of ethylene per mol of sulfuric acid, adding said ethylated acid progressively to water and simultaneously heating the mixture to distill over the ethanol as it is formed by the hydrolysis while accumulating sulfuric acid in said water with progressively increasing concentration.

5. The process of forming ethanol comprising absorbing ethylene in sulfuric acid to produce an ethylated sulfuric acid in concentrated form, adding said ethylated acid progressively to a given quantity of water and simultaneously heating the entire mixture to distill over the ethanol as it is formed by the hydrolysis, and continuing the addition of the acid and the distilling of the ethanol until the concentration of the acid after hydrolysis is 50% $H_2SO_4$ or more.

6. The process of forming ethanol comprising absorbing ethylene in sulfuric acid to produce an ethylated sulfuric acid in concentrated form, adding said ethylated acid progressively to a given quantity of water and simultaneously heating the entire mixture to distill over the ethanol as it is formed by the hydrolysis, continuing the addition of the acid and the distilling of the ethanol until the concentration of the acid after hydrolysis is 50% $H_2SO_4$ or more, and reconcentrating said acid for reuse.

7. The process of forming an olefinated acid comprising providing the acid in a tower or the like, bubbling an olefine containing gas upward through said acid, and controlling the supply of gas to maintain the rate of flow at a critical rate which is sufficiently high to maintain the olefine content of the exit gas at a minimum, said rate being characterized by the fact that if it be either increased or decreased, the olefine content of the exit gas increases.

8. The process of forming an ethylated sulfuric acid comprising providing the acid in a tower or the like, bubbling an ethylene containing gas upward through said tower and controlling the supply of gas to maintain the rate of flow at a critical rate which is sufficiently high to maintain the ethylene content of the exit gas at a minimum said rate being characterized by the fact that if it be either increased or decreased, the ethylene content of the exit gas increases.

9. The process of hydrolyzing an olefinated acid comprising providing the acid substantially saturated with an olefine, adding said acid progressively to a predetermined quantity of water to progressively increase the concentration of the said acid therein, and simultaneously heating the mixture to distill off the product as it is formed by the hydrolysis.

10. A hydrolyzing process comprising subjecting material to reaction with an acid and absorbing said material in said acid in excess of 50% of the amount required to completely replace all of the replaceable hydrogen of the acid employed, and then gradually and progressively introducing the product of said reaction into a predetermined quantity of water, accumulating said acid in said water with progressively increasing concentration while continuously removing from said water a product of the resulting hydrolysis.

11. A hydrolyzing process comprising subjecting material to reaction with an acid and absorbing said material in said acid in excess of 50% of the amount required to completely replace all of the replaceable hydrogen of the acid employed, and then gradually and progressively introducing the product of said reaction into a predetermined quantity of water, accumulating said acid in said water with progressively increasing concentration while continuously supplying heat to remove from said water a product of the resulting hydrolysis as it forms.

12. Process of producing ethyl alcohol from ethylene which comprises the steps of reacting the ethylene with sulfuric acid to form an ethyl sulfate liquor; adding said liquor to boiling water in such manner that the ethyl sulfates are hydrolyzed to form ethyl alcohol and that said alcohol is rapidly removed from the hydrolysis mixture as it is formed; and recovering said removed alcohol.

13. Process of producing ethyl alcohol from ethyl sulfate liquor containing ethyl sulfates which comprises adding said liquor to boiling water in such manner that ethyl sulfates are hydrolyzed to form ethyl alcohol and that said alcohol is rapidly removed from the hydrolysis mixture as it is formed; and recovering said removed alcohol.

14. Process of producing ethyl alcohol by hydrolysis of ethyl sulfates which comprises adding the ethyl sulfates to boiling water in such manner and at such a rate that the ethyl sulfates are hydrolyzed to form ethyl alcohol and that said alcohol is rapidly distilled from the hydrolysis mixture.

15. Process of hydrolyzing ethyl sulphates wherein sulphates are continuously added to and ethyl alcohol continuously distilled from, a body of boiling water at such a rate that at no time is there a high concentration in the hydrolysis mixture of either ethyl sulphates or the ethyl alcohol and the operation is continued until the concentration of sulphuric acid in the water reaches a predetermined limit.

WALTON B. SCOTT.
LLOYD S. BOVIER.
ERNEST D. MATTHEWS.